United States Patent [19]

Shimano et al.

[11] Patent Number: 5,007,739
[45] Date of Patent: Apr. 16, 1991

[54] LENGTH MEASURING APPARATUS

[75] Inventors: Masami Shimano; Atuhiro Sano, both of Shizuoka, Japan

[73] Assignee: Fuji Photo Film Co., Ltd., Kanagawa, Japan

[21] Appl. No.: 432,918

[22] Filed: Oct. 24, 1989

[30] Foreign Application Priority Data

Oct. 24, 1988 [JP] Japan ................................ 63-267675

[51] Int. Cl.⁵ ............................................. G01B 11/04
[52] U.S. Cl. .................... 356/383; 356/150; 250/560
[58] Field of Search ...................... 356/150, 152, 383; 250/560, 561, 571; 271/227, 261

[56] References Cited

U.S. PATENT DOCUMENTS

| | | | |
|---|---|---|---|
| 3,621,266 | 11/1971 | Akuta et al. | 356/383 |
| 4,088,411 | 5/1978 | Ahlquist et al. | 356/383 |
| 4,201,378 | 5/1980 | Hamis | 250/561 |
| 4,623,975 | 11/1986 | Kagami | 250/560 |

FOREIGN PATENT DOCUMENTS

| | | |
|---|---|---|
| 0110146 | 6/1984 | European Pat. Off. . |
| 214920 | 10/1984 | Fed. Rep. of Germany ...... 356/383 |
| 3543993 | 6/1987 | Fed. Rep. of Germany . |
| 142503 | 9/1982 | Japan ................................ 250/560 |
| 58-191908 | 11/1983 | Japan . |
| 60-155314 | 9/1985 | Japan . |
| 60-57003 | 12/1985 | Japan . |

*Primary Examiner*—Richard A. Rosenberger
*Attorney, Agent, or Firm*—Young & Thompson

[57] ABSTRACT

An apparatus for measuring the length of a sheet moving at a constant speed in one direction comprises front and rear edge detectors for detecting front and rear edges of the sheet to output front and rear edge signals, respectively, and an angle detector for detecting the angle at which the sheet moving in that one direction is inclined relative to that one direction to output an angle signal representative of the angle of inclination. An arithmetic circuit operates to calculate an apparent length of the sheet in the direction based on the front and rear edge signals and to correct that apparent length of the sheet with the angle signal so as to determine the actual length of the sheet.

6 Claims, 4 Drawing Sheets

LENGTH MEASURING APPARATUS

BACKGROUND OF THE INVENTION

The present invention relates to a measuring apparatus, and more particularly to an apparatus for measuring the length of a sheet.

Various kinds of measuring apparatus for measuring the size or the squareness of a rectangular or square sheet are known. One such measuring apparatus is known from for example, Japanese Pat. Publ. No. 60-57003. The measuring apparatus described in this publication consists of four optical angle sensors for detecting corner angles of the sheet and an arithmetic circuit for calculating not only the differences between actual lengths and reference lengths for the four sides of the sheet based on the detected corner angles but also the squareness of the sheet. To place the sheet accurately on a measuring table, two guide rollers are disposed along two sides of the measuring table perpendicular to each other.

Another such measuring apparatus is known from Japanese Unexam. Pat. Publ. No. 58-191,908. The measuring apparatus described in this latter publication consists of two cameras having photodiode arrays to detect front and rear sides of a sheet in synchronism with each other. To improve the accuracy of measurement, it is adapted to collect or pick up data from the cameras at a time interval such that the difference between times at which the cameras detect the front and rear sides of the sheet, respectively, will be the least.

The sheet is usually cut from a long web of sheet material by means of a shearing or cutting machine. One such cutting machine is known from Japanese Unexam. Pat. Publ. No. 60-155,314. The cutting machine described in that publication includes scanning cameras which serve as web position correcting means located upstream of the position wherein the long web is cut to sheets, for measuring both sides of a long web running at a constant speed to position the web accurately in the cutting position.

There are, however, various disadvantages or problems in connection with the above-described apparatus. That is, the measuring apparatus described in Japanese Pat. Publ. No. 60-57003 positions the sheet on the measuring table when the sheet conveying system is stopped. The apparatus is therefore inconvenient to use in measuring sheets separately one by one. The measuring apparatus described in Japanese Unexam. Pat. Publ. No. 58-191908, on the other hand has difficulty in accurately measuring when a sheet runs at an inclination to the direction of lengthwise movement. Even in the Japanese Unexam. Pat. Publ. No. 60-155,314, accurate measurement is difficult because of variations in sheet lengths.

OBJECT OF THE INVENTION

It is, therefore, an object of the present invention to provide a sheet measuring apparatus which performs accurate measurement while a conveyor system for the measured sheets continuously operates.

SUMMARY OF THE INVENTION

The above object of the present invention is achieved by providing a sheet length measuring apparatus comprising front and rear edge detecting means for detecting the front and rear edges of a sheet moving at a constant speed in a predetermined direction and for outputting front and rear edge signals, respectively, and a means for detecting inclination of the sheet relative to the predetermined direction and for outputting an inclination angle signal representative of the inclination. An arithmetic means operates to calculate the apparent length of the sheet in the direction of movement based on the front and rear edge signals and to correct the apparent length of the sheet with the inclination angle signal, thereby determining the actual length of the sheet.

In accordance with the present invention, by detecting the inclination angle of a sheet relative to the predetermined direction in which the sheet is intended to move at a constant speed, and by detecting the apparent length of a sheet in that predetermined direction, it is possible to calculate the actual length of the sheet during the movement of the sheet. This makes it possible to effect a real time decision whether the sheet is standard or substandard.

BRIEF DESCRIPTION OF THE DRAWINGS

The above and other objects and features of the present invention will be apparent from the following description of a preferred embodiment taken in conjunction with the appended drawings, in which.

DETAILED DESCRIPTION OF THE INVENTION

Figure 1:
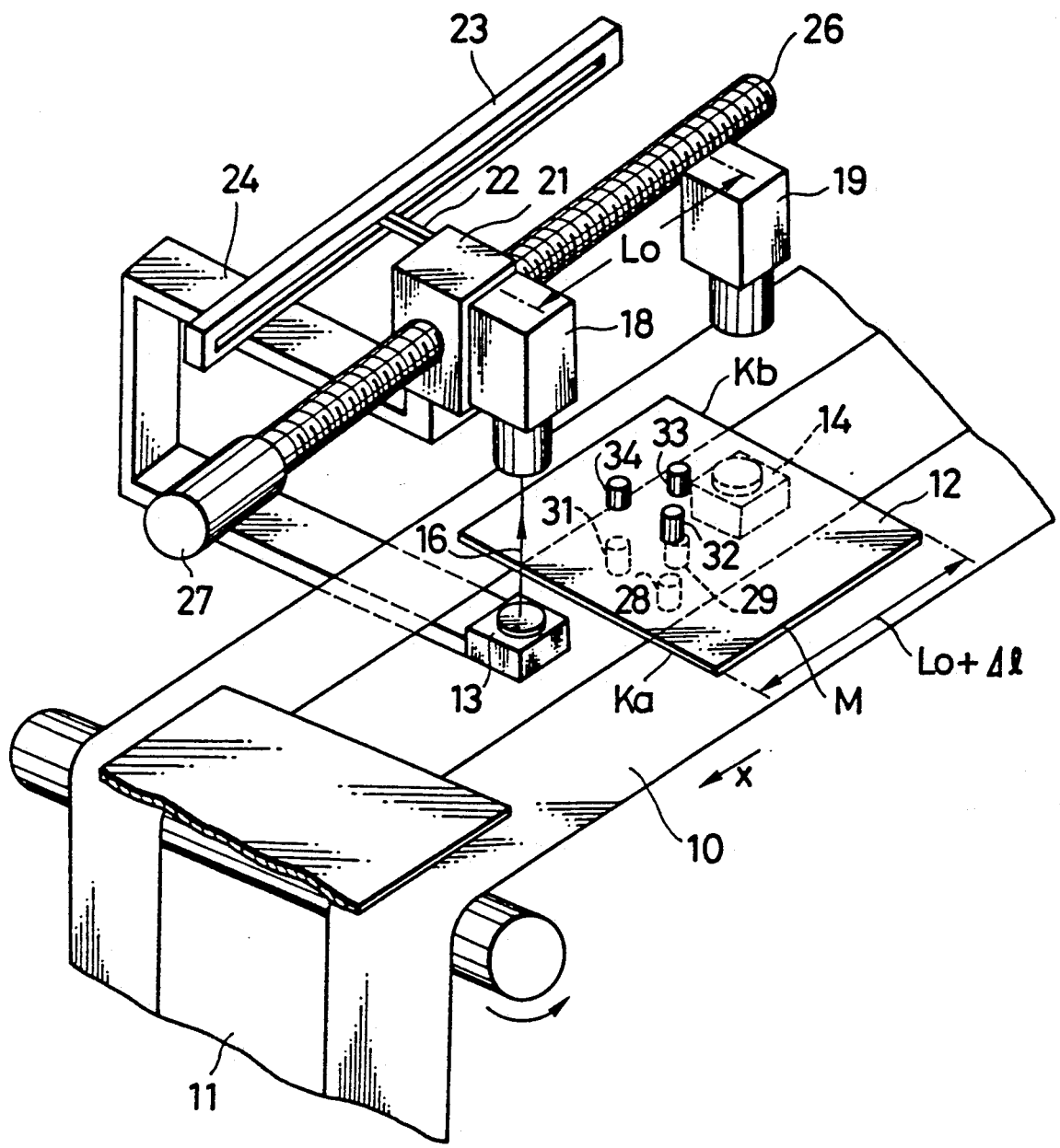
FIG. 1 is a perspective view of a length measuring apparatus in accordance with a preferred embodiment of the present invention.

Referring to the drawings in detail, and in particular to FIG. 1, a sheet measuring apparatus 1 in accordance with a preferred embodiment of the present invention is shown, having a conveyor belt 10 provided with a central transparent belt section 11 extending in the lengthwise direction in which the conveyor belt 10 moves. The conveyor belt 10, which is moved in the direction shown by an arrow X at a constant speed by a rotating roller driven by a motor (not shown), conveys sheet 12 placed thereon. Sheets 12 are made by cutting a long web having a certain width to a desired sheet length $L_0$ by means of a web cutting apparatus (not shown) which may be of any type well known in the art. The actual sheet length L of the sheet 12 cut aiming at the desired length $L_0$ often includes a cutting error $\delta 1$ in length and given by, the following equation:

$$L = L_0 + \delta 1$$

If the cutting error $\delta 1$ is not within an allowable range, the sheet should be eliminated as substandard.

Under the transparent belt section 11 of the conveyor belt 10, there are two light sources 13 and 14 providing diffused light. The diffused light from the light sources 13 and 14 is received by line scanning cameras 18 and 19 (which are referred to simply as upstream and downstream scanning cameras) disposed above the transparent belt section 11 of the conveyor belt 10, respectively. Each scanning camera 18, 19, which includes a CCD sensor with a pixel array arranged in the same lengthwise direction X as the conveyor belt 10, receives the light from the associated light source 13, 14, thereby detecting the front and rear edges $K_a$ and $K_b$ of the sheet 12 passing thereunder.

The distance between the upstream and downstream cameras 18 and 19, and also between the light source units 13 and 14, is adjusted according to the desired sheet length $L_0$ for the sheet to be measured by means of a distance adjusting mechanism which includes a generally U-shaped arm 24 having a support block 21 formed with a hole having female threads, which is supported by a threaded rotatable rod 26 for movement in the lengthwise direction X. One of the upstream and downstream cameras, for example the downstream camera 18, is attached to the support block 21 and the corresponding light source 13 is mounted on the other end of the U-shaped arm 24. The threaded rotatable rod 26 is operationally coupled to a motor-driven rotary device 27 so as to be rotated in either direction, thereby displacing the downstream scanning camera 18 and the light source unit 13 supported by the U-shaped arm 24 in the corresponding lengthwise direction. The support block 21 is associated with a camera position sensor 23 through a signaling lever 22 attached thereto.

Figure 2:
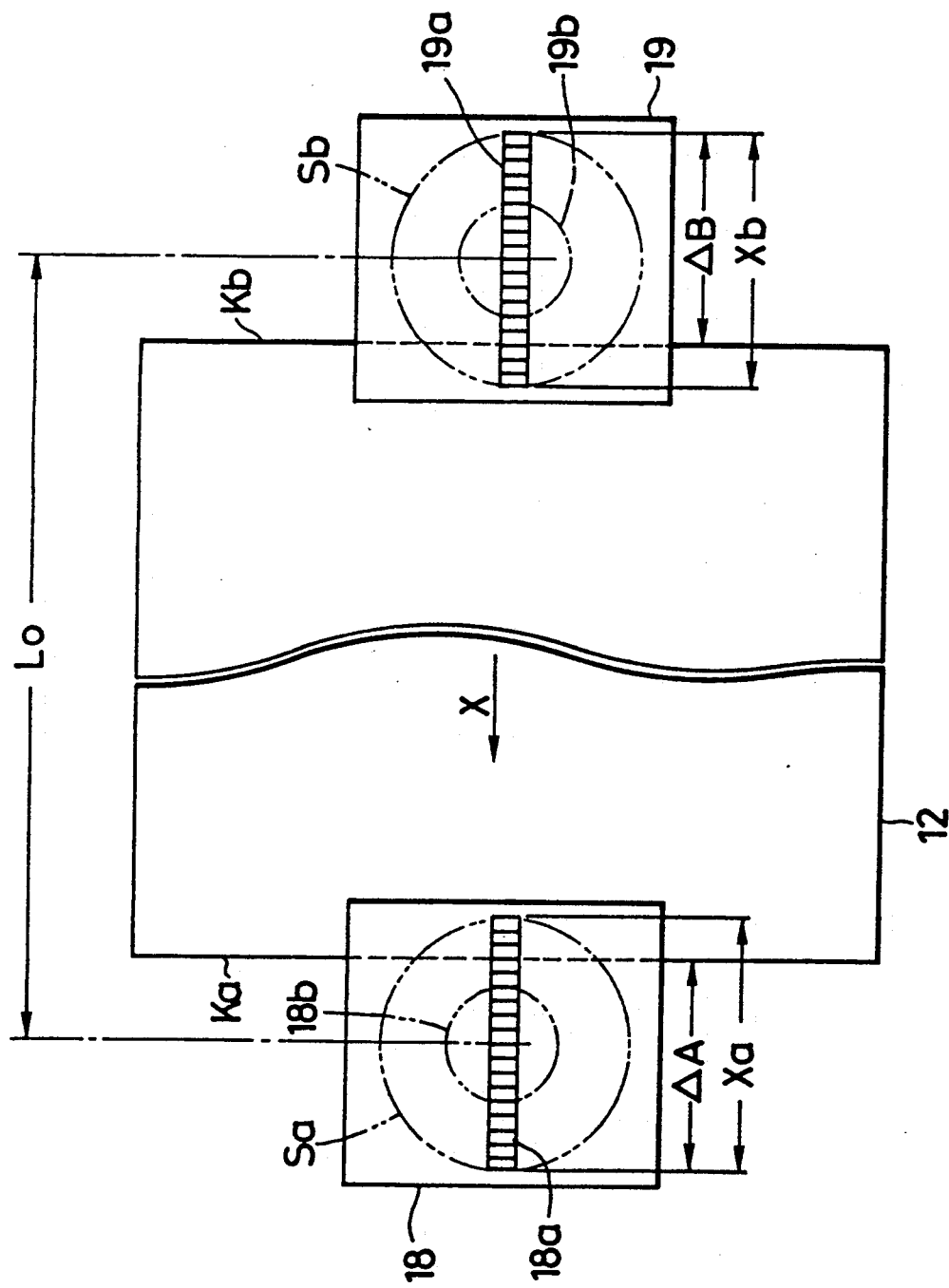
FIG. 2 is an explanatory plan view of edge detecting means of the length measuring apparatus shown in FIG. 1.

As shown in FIG. 2, the upstream and downstream scanning cameras 18 and 19, which have fields of view $S_a$ and $S_b$, respectively, are provided with CCD arrays 18a and 19a disposed in their focal planes and extending in the lengthwise direction. Each CCD array 18a, 19a has a line arrangement of a number $X_a$, $X_b$ of pixels. Because each pixel provides digital signals, namely a logic "1" when receiving light or a logic "0" when receiving no light, the upstream and downstream scanning cameras 18 and 19 provide $X_a$-bit data and $X_b$-bit data.

If the sheet 12 is placed partly over some pixels of both CCD arrays 18a and 19a as shown in FIG. 2, the pixels covered by the sheet 12 provide logic signals "0" and the remaining pixels logic signals "1". As the sheet moves in the lengthwise direction, the CCD array 19a increasingly changes the number $\Delta B$ of pixels that provide the logic signal "1" and on the other hand, the CCD array 18a decreasingly changes the number $\Delta A$ of pixels that provide the logic signal "1".

Between the light source units 13 and 14, there are three light-emitting elements 28, 29, 31 arranged in a triangle formation under the transparent belt section 11 and three light-receiving elements 32-34 positioned correspondingly to the light-emitting elements 28, 29, 31 above the transparent belt section 11. These light-emitting elements 28, 29, 31 and light-receiving elements 32-34 form an angle sensor for detecting the inclination of the centerline of the sheet 12 placed on the conveyor belt 10 with respect to the lengthwise direction. For accurate detection, the light-emitting element 29 and the light-receiving element 33 are exactly correspondingly located along the centerline $X_L$ (FIG. 4) of the transparent belt section 11 of the conveyor belt 10, and the light-emitting elements 28 and 31 and the light-receiving elements 32 and 34 are also exactly correspondingly located on opposite sides of the centerline $X_L$ parallel to the lengthwise direction X.

Figure 4:
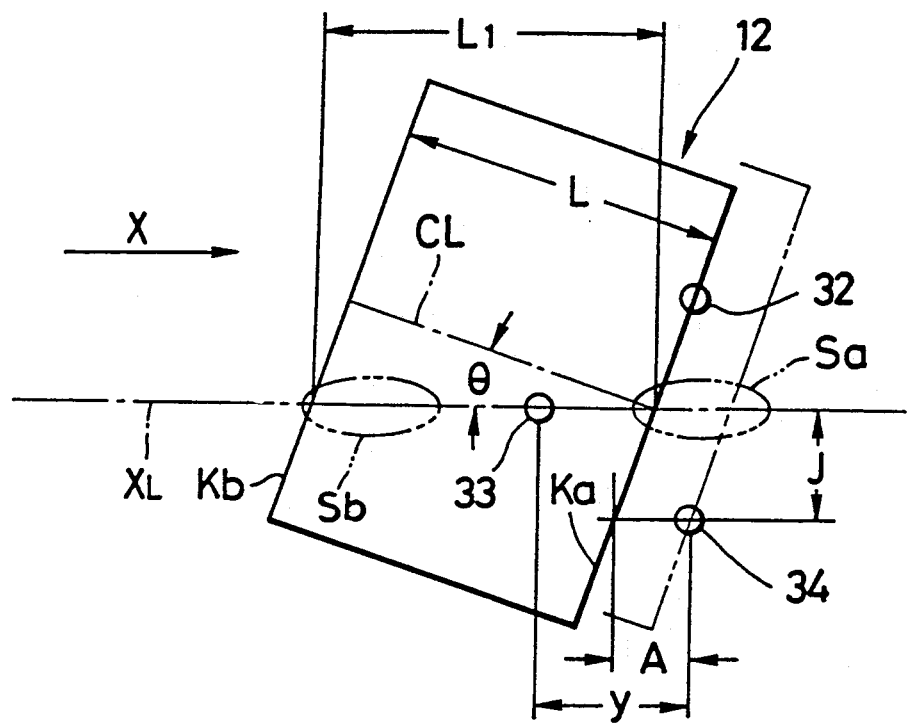
FIG. 4 is an explanatory view showing an arrangement of an angle detecting means of the length measuring apparatus for detecting the angle of inclination of a sheet to be measured.
Figure 5:
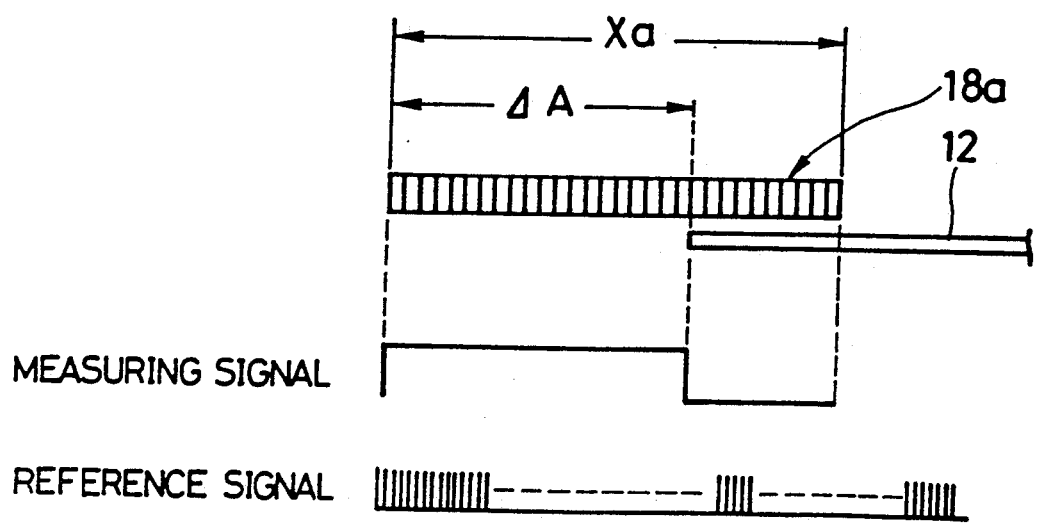
FIG. 5 is an explanatory view showing the function of a counter unit used in the circuit of FIG. 3.

Light-receiving element 34 is thus spaced a distance J from the centerline $X_L$ and a distance Y from the element 33 in the lengthwise direction, as shown in FIG. 4.

Figure 3:
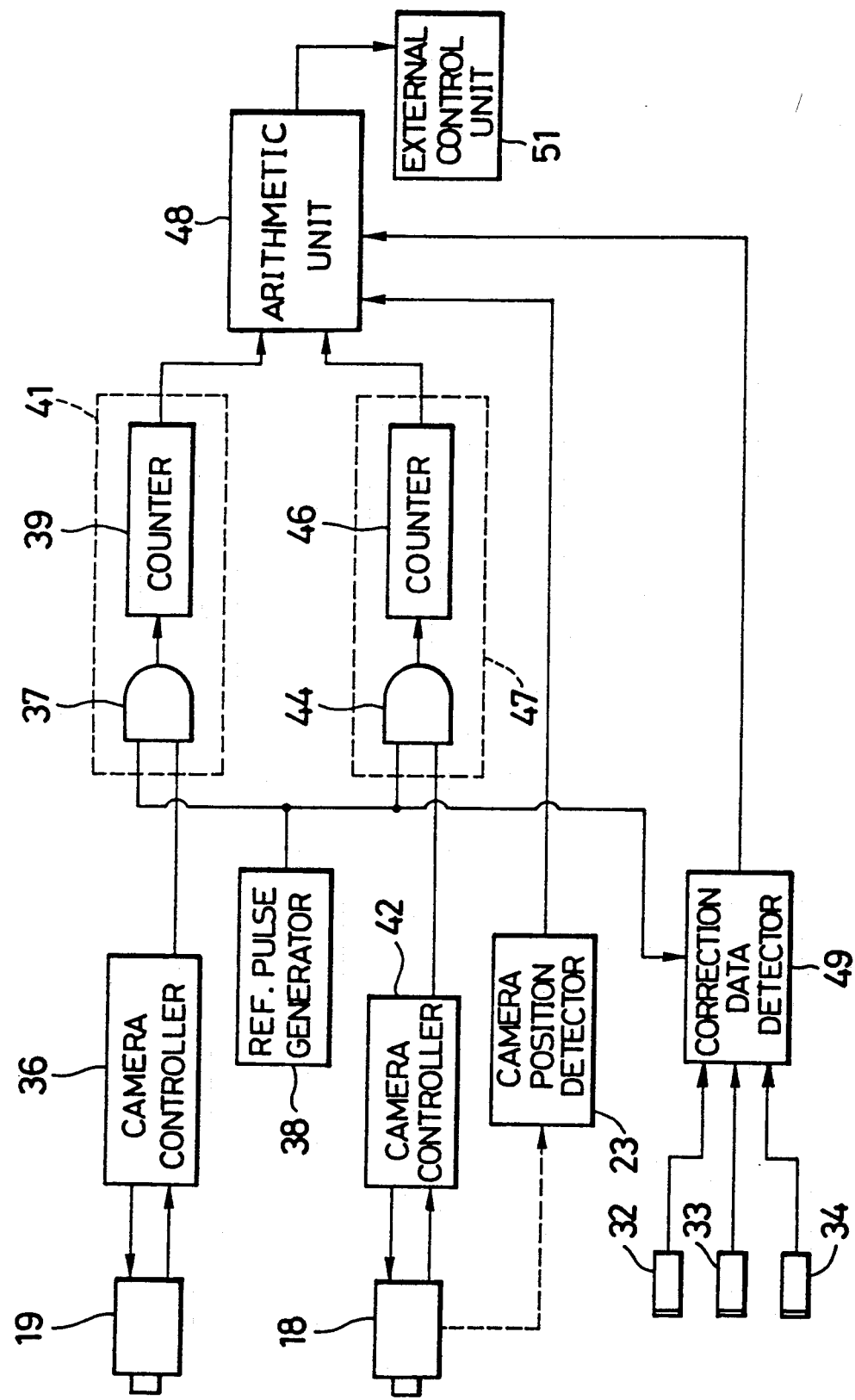
FIG. 3 is a block diagram showing a circuit incorporated in the length measuring apparatus shown in FIG. 1.

The length measuring apparatus cooperates with a control circuit shown in FIG. 3, having camera controllers 36 and 42 for operating the upstream and downstream scanning cameras 18 and 19, respectively. Each camera controller 36, 42 generates drive pulses for driving the CCD array 18a, 19a of the scanning camera 18, 19 so as to output the logic signals "0" or "1" in synchronism with the drive pulses. The camera controllers 36 and 42, upon receiving the logic signals, output pulses having pulse widths corresponding to the numbers ($\Delta B$, $\Delta A$) of pixels outputting a logic signal "1", which are referred to as sheet length signals, to high speed counters 41 and 47, each consisting of AND gate 37, 44 and a counter 39, 46.

The high speed counter 41 receives a sheet length signal from the camera controller 36 and a high frequency reference clock pulse generated by means of a reference pulse generator 38 through AND gate 37. The counter 39 counts reference clock pulses passing through AND gate 27. The high speed counter 47 is identical in structure and operation to the high speed counter 41 and therefore its further description need not be given herein.

An arithmetic unit 48 receives signals of the counted values from the high speed counters 41 and 47 to determine the actual sheet length L. For the determination of the actual length L of sheet, the arithmetic unit 48 receives correction data regarding the inclination of the centerline of the sheet 12 on the conveyor belt 10 with respect to the lengthwise direction from a correction data detector 49 connected to the angle sensor consisting of the three light-receiving elements 32-34. The correction data detector 49, which is similar in structure to the high speed counters 41 an 47, is structured to convert timing signals from the light-receiving elements 32-34 when the sheet 12 passes under the respective light-receiving elements 32-34, into the numbers of reference clock pulses from the reference pulse generator 38. An external control unit 51, which is connected to the arithmetic unit 48, classifies sheets into standard and substandard sheets in accordance with their sheet length as determined by the arithmetic unit 48.

In operation of the sheet measuring apparatus described above, after the distance between the upstream and downstream scanning cameras 18 and 19 is adjusted to a desired sheet length $L_0$ by rotating the threaded rotatable rod 26, the conveyor belt 10 is driven to move a sheet 12 in the lengthwise direction. Before either of the upstream or downstream scanning cameras 18 and 19 detects the sheet 12, or when either front or rear side Ka, Kb of the sheet 12 is out of the field of view $S_a$, $S_b$ of each scanning camera 18, 19, because all of the pixels of the CCD arrays 18a and 19a of the upstream side and downstream side scanning cameras 18 and 19 output logic signals "1", the arithmetic unit 48 does not initiate its operation.

When the sheet 12 is further moved in the lengthwise direction X, it decreasingly changes the number of pixels of the CCD array 19a of the upstream side scanning camera 19 that output a logic signal "1" but maintains all of the pixels of the CCD array 18a of the downstream scanning camera 18 to provide a logic signal "1". Upon the sheet 12 partly covering the CCD array 18a of the downstream scanning camera 18 and partly uncovering the CCD array 19a of the upstream scanning camera 19, the arithmetic unit 48 starts its operation.

As an example, let us consider the sheet 12 to have reached a position shown in FIG. 2 wherein it uncovers a number $\Delta A$ of pixels of the CCD array 18a of the downstream scanning camera 18 in the field of view $S_a$ and a number $\Delta B$ of pixels of the CCD array 19a of the upstream scanning camera 19 in the field of view $S_b$. Accordingly, at this point, the downstream scanning camera 18 outputs a length signal having a high level of pulse width corresponding to the number $\Delta A$ of logic signals "1" to AND gate 37 of the high speed counter 41 and opens this AND gate until the high level length pulse extinguishes. Because the reference pulse generator 38 outputs a reference clock pulse to AND gate 37, the counter 39 of the high speed counter 41 counts up the reference clock pulses while AND gate 37 opens. Because the upstream scanning camera 19 outputs a length signal in the same manner as the downstream scanning camera 18, the high speed counter 47 counts the number $\Delta B$ of reference clock pulses. The numbers $C_a$ and $C_b$ of pixels of the CCD arrays 18a and 19b covered by the sheet 12 are given as follows:

$$C_a = X_b - \Delta A$$

$$C_b = X_b - \Delta B$$

From the counted numbers $C_a$ and $C_b$ of pixels of the CCD arrays 18a and 19b, the distances of the front and rear sides $K_a$ and $K_b$ of the sheet 12 from the centers of the fields of view $S_a$ and $S_b$, respectively are calculated. These distances are then multiplied by a unit length $\Delta d$ relative to the length of one pixel of the CCD array in the lengthwise direction X. Then, the difference D relative to the distance between the centers of the fields of views $S_a$ and $P_b$ is obtained as follows:

$$D = [(C_a + C_b) - (X_a + X_b)/2] \times \Delta d.$$

The sheet length $L_{D-1}$ in this position is calculated from the difference and the distance between the upstream and downstream scanning cameras 18 and 19 that is the desired sheet length $L_0$ as follows:

$$L_1 - 1 = L_0 + D$$

The calculation of difference D is repeated N times at various points distributed lengthwise from when the front side $K_a$ of the sheet 12 comes into the field of view $S_a$ of the downstream scanning camera 18, to when the rear side $K_b$ of the sheet 12 leaves the field of view $S_b$ of the upstream scanning camera 19. Finally, an apparent sheet length $L_1$ is obtained as the arithmetical mean value of sheet lengths $L_{1-1}, L_{1-2}, L_{1-3}, \ldots, L_{1-N}$. The apparent sheet length $L_1$ is given by the following equation:

$$L_1 = 1/N \times \sum_{i=1}^{N} (L_{1-1}) \quad (1)$$

When the sheet 12 is not inclined with respect to the direction of movement while it moves in the lengthwise direction, the apparent sheet length $L_1$ is taken as the actual sheet length L. However, if the sheet 12 is inclined at an angle with respect to the lengthwise direction X or the centerline $X_L$ parallel to the lengthwise direction X and crosses the light-receiving element 33 as shown in FIG. 4, the actual sheet length L is obtained by correcting the apparent sheet length $L_1$ obtained from the operation of the equation (1). The angle of $\theta$ inclination of the sheet 12 is detected by the optical angle sensor consisting of the three sets of the light-emitting elements and light-receiving elements 28, 29, 31 and 32–34. That is, the correction data detector 49 is adapted to detect the reversal time of the output from each light-receiving element 32, 33, 34 as the number of reference clock pulses before the reversal of the output.

Considering the sheet 12 to be positioned on the conveyor belt 10 at an angle of inclination $\theta$ with respect to the centerline $X_L$ and that a straight line CL connects the centers of the front and rear sides $K_a$ and $K_b$ of the sheet 12, the angle of inclination of the sheet 12 is the angle between the lines $X_L$ and $C_L$. When the sheet 12 moves in the lengthwise direction X, the front side $K_a$ of the sheet 12 is detected first by the light-receiving element 33 and then by the light-receiving element 32. The time that elapses between the detections of the front side $K_a$ of the sheet 12 by the light-receiving elements 33 and 32 is detected as the number $CU_a$ of reference clock pulses counted by the correction data generator 49. In the same manner, the time that elapses between the detection of the front side $K_a$ of the sheet 12 by the light-receiving elements 32 and 34 is detected as the number $CU_b$ of reference clock pulses counted by the correction data generator 49. The counted values $CU_a$ and $CU_b$ of reference clock pulses are output to the arithmetic unit 48.

In the arithmetic unit 48, the arithmetical mean value $CU_x$ of the counted values $CU_a$ and $CU_b$ is calculated as follows:

$$CU_x = (CU_a + CU_b)/2$$

Because of the symmetry of location of the light-receiving elements 32 and 34 with respect to centerline $X_L$ and the same lengthwise distance Y from the light-receiving element 33, the mean count value $CU_x$ is proportional to the time required for the sheet 12 to move the distance Y. Accordingly, the length $\Delta Y$ per count is given as follows:

$$\Delta Y = Y/CU_x$$

The distance A by which the sheet 12 moves from the time the light-receiving element 32 detects the front side $K_a$ to the time the light-receiving element 34 detects the front side $K_a$ is given as follows:

$$A = (|CU_a - CU_b|) \times \Delta Y$$

Because the distance A depends on the angle of inclination $\Delta$ of the sheet 12, a correction length $\delta c$ is calculated based on the distance A, from the following relationships:

$$= \tan^{-1}(A/2 \times J)$$

$$\delta c = L_2(1 - \cos\theta)$$

Finally, the actual sheet length L is calculated from the following relationship:

$$L = L_1 - \delta c$$

After the calculation of the actual sheet length L, either with or without correction, the arithmetic unit 48 effects a comparison of the actual sheet length L with the desired sheet length $L_0$ so as to detect the difference between these sheet lengths L and $L_0$. If the difference lies outside an allowable range, the operation unit causes the external control unit 51 to classify the sheet 12 as a substandard sheet and deliver it into a substandard sheet receptacle (not shown).

In addition to detecting the front edge of the sheet in order to calculate the correct length of the sheet, it is advantageous to detect the rear edge of the sheet for calculating a correction length δc. It is possible to determine this correction length δc based on the time difference between the detections of the edge of the sheet by light-receiving elements 32 and 34. This eliminates the need for the light-receiving element 33 and the light-emitting element 29.

Although the present invention has been fully described by way of the preferred embodiment thereof with reference to the accompanying drawings, it is to be noted that various changes and modifications will be apparent to those skilled in the art. Therefore, unless otherwise these changes and modifications depart from the scope of the present invention, they should be construed as being included therein.

What is claimed is:

1. A measuring apparatus for measuring the actual length of a sheet moving at a constant speed in one direction, said apparatus comprising:
   front edge detecting means for detecting the front edge of said sheet and for outputting a front edge signal;
   rear edge detecting means disposed at a distance substantially equal to a desired sheet length from said front edge detecting means in said one direction for detecting the rear edge of said sheet and for outputting a rear edge signal;
   inclination detecting means for detecting the angle of inclination of said sheet with respect to said one direction and for outputting an angle signal representative of said inclination angle;
   said inclination detecting means comprising three sets of photosensors arranged at the apices of an isosceles triangle of which a perpendicular bisector of the base is parallel to said one direction and passes through the apex remote from the base; and
   arithmetic means for determining an apparent length of said sheet in said one direction based on said front and rear edge signals output from said front edge and rear edge detecting means and for correcting said apparent length to said actual length based on said angle signal from said inclination detecting means.

2. A length measuring apparatus as defined in claim 1, wherein each of said front edge and rear edge detecting means comprises a line sensor disposed in parallel with said one direction and an image forming lens having an image circle having a diameter substantially equal to a whole number of increments of length of said line sensor, said line sensor being driven to output a pulse signal having a pulse width representing the ratio of the length of that part of said line sensor on which is formed no image of said sheet by said image-forming lens to the whole length of said line sensor.

3. A length measuring apparatus as defined in claim 2, wherein said line sensor has a plurality of photosensitive elements arranged in a straight line in parallel with said one direction.

4. A length measuring apparatus as defined in claim 1, wherein each of said front edge and rear edge detecting means includes an illuminating means disposed on one side of a plane in which said sheet moves.

5. A length measuring apparatus as defined in claim 1, wherein said front edge and rear edge detecting means are shiftable relative to each other in said one direction.

6. A length measuring apparatus as defined in claim 1, wherein each said photosensor consists of a photoelectric element disposed on one side of a plane in which said sheet moves and a light-emitting element disposed on the other side of said plane.

* * * * *